(12) United States Patent
Miyazaki

(10) Patent No.: US 6,597,741 B1
(45) Date of Patent: Jul. 22, 2003

(54) DIGITAL VIDEO DECODING OF COMPRESSED DIGITAL PICTURES BY CORRECTING CORRUPTED HEADER INFORMATION WITH AN ESTIMATED PICTURE SIZE

(75) Inventor: Takashi Miyazaki, Tokyo (JP)

(73) Assignee: NEC Corporation (JP)

( * ) Notice: Subject to any disclaimer, the term of this patent is extended or adjusted under 35 U.S.C. 154(b) by 413 days.

(21) Appl. No.: 09/718,204

(22) Filed: Nov. 21, 2000

(30) Foreign Application Priority Data

Nov. 25, 1999 (JP) .......................... 11-335138

(51) Int. Cl.[7] .......................... H04N 7/04; H04N 7/26; H04N 11/04
(52) U.S. Cl. ............................... 375/240.25
(58) Field of Search ............... 375/240.25, 240.26, 375/240.27; 386/95, 109; H04N 7/04, 7/26, 11/04

(56) References Cited

U.S. PATENT DOCUMENTS

| | | | | |
|---|---|---|---|---|
| 5,647,048 A | * | 7/1997 | Ting et al. ..................... | 386/68 |
| 5,675,387 A | * | 10/1997 | Hoogenboom et al. | 375/240.15 |
| 5,859,950 A | * | 1/1999 | Iwamoto ....................... | 386/94 |
| 5,973,744 A | * | 10/1999 | Kim ....................... | 375/240.24 |
| 6,040,867 A | * | 3/2000 | Bando et al. .......... | 375/240.27 |
| 6,094,455 A | * | 7/2000 | Katta ..................... | 375/240.05 |
| 6,377,748 B1 | * | 4/2002 | Schultz et al. ............... | 386/124 |

FOREIGN PATENT DOCUMENTS

JP  6-98313  4/1994

* cited by examiner

*Primary Examiner*—Nhon Diep
(74) *Attorney, Agent, or Firm*—Dickstein Shapiro Morin & Oshinsky LLP

(57) ABSTRACT

A video decoding apparatus receives a compressed digital video signal containing a sequence header and at least one coded picture. A coded sequence data contained in the header is decoded and stored in a memory. A video decoding process is performed on the coded picture. During this process a first macroblock count is produced to represent the number of macroblocks contained in the decoded picture and the decoding process is suspended. A second macroblock count is then determined from picture size data in the memory and compared with the first macroblock count. The video decoding process by using the stored sequence data is resumed immediately after the first and second macroblock counts are determined to be equal to each other. Otherwise, this decoding process is delayed until the sequence data of the memory is corrected with data representing an estimated picture size.

10 Claims, 2 Drawing Sheets

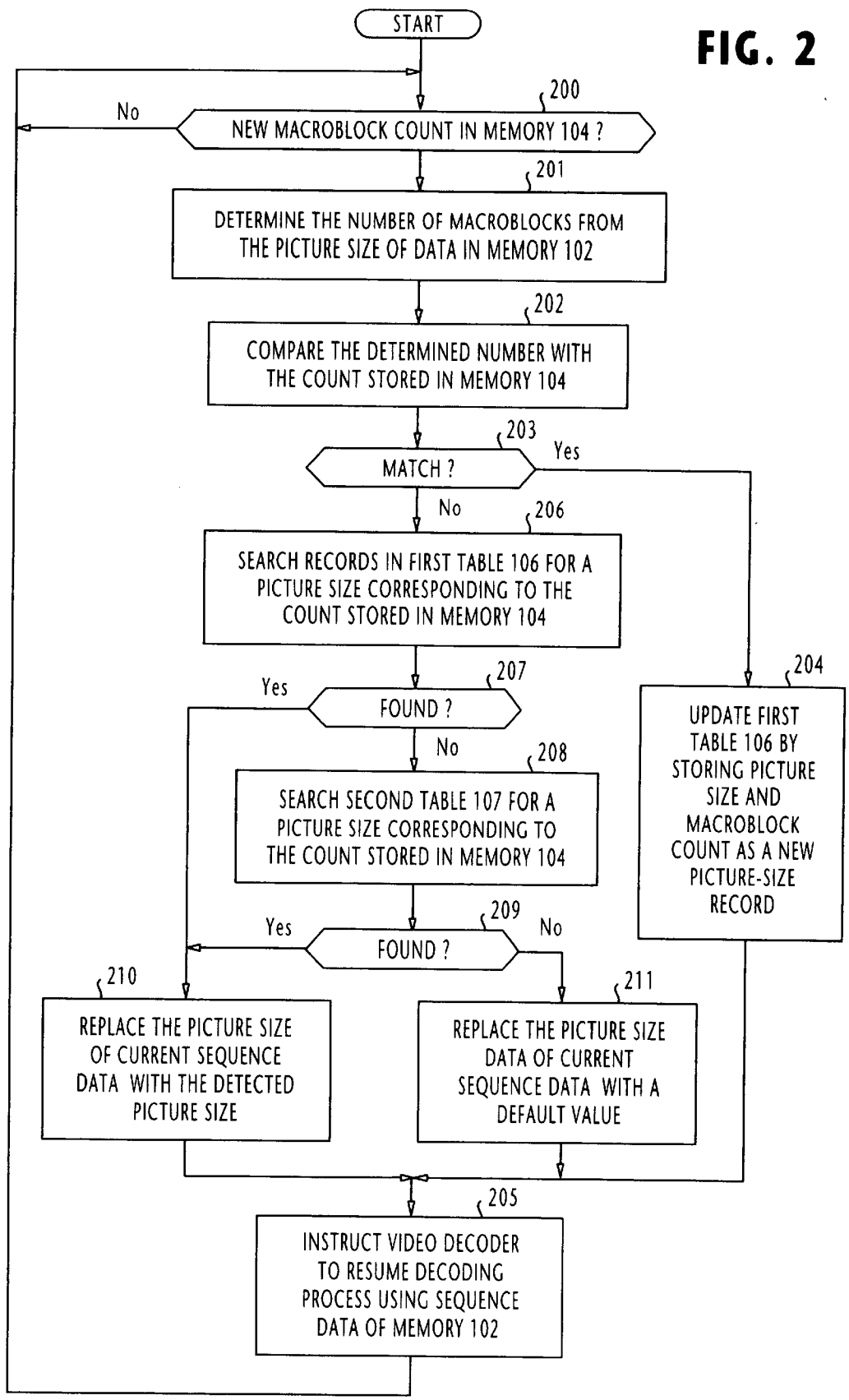

DIGITAL VIDEO DECODING OF COMPRESSED DIGITAL PICTURES BY CORRECTING CORRUPTED HEADER INFORMATION WITH AN ESTIMATED PICTURE SIZE

BACKGROUND OF THE INVENTION

1. Field of the Invention

The present invention relates to the decoding of compressed video sequence consisting of a sequence header followed by one or more groups of coded pictures. The present invention is particularly concerned with a technique whereby compressed pictures are properly decoded even if the header information is corrupted or lost.

2. Description of the Related Art

Error correction decoders have been developed and used extensively for decoding coded pictures which have been subjected to a forward error correction process at the source site. At a sink site, error correction bits are detected and used to correct data in error. However, if the signal has been corrupted beyond the error correcting capability of the decoder, forward error correction does not work properly. To this end, a replacement technique has been proposed whereby the corrupted portion of data is replaced with one that is properly decoded in previous signals. Japanese Patent Publication 6-98313 discloses this replacement technique.

However, if an error occurs in the header of a compressed video signal and the correction process at the sink site fails to properly correct the error, subsequent decoding of video signals is detrimentally affected. In the MPEG format, picture size information is contained in the sequence header. If this information is corrupted, the information necessary for properly recovering a subsequent group of compressed pictures would be lost entirely and normal reproduction of pictures is impossible.

SUMMARY OF THE INVENTION

It is therefore an object of the present invention to provide a video decoding apparatus and method that allows coded video signals to be recovered even when the header information is corrupted.

According to a first aspect, the present invention provides a video decoding apparatus for decoding a coded video signal containing a sequence header and at least one coded picture, the sequence header including picture size data, the apparatus comprising a sequence header decoder for decoding a coded sequence data contained in the header and storing the decoded sequence data in a memory, a video decoder for performing a decoding process on a coded picture and producing a first macroblock count from the decoded picture and suspending the decoding process when the first macroblock count is produced, the macroblock count representing a number of macroblocks contained in the decoded picture, and control circuitry for (a) determining a second macroblock count from picture size of the sequence data stored in the memory, (b) comparing the first macroblock count with the second macroblock count, (c) if the first and second macroblock counts are not equal to each other, estimating a picture size based on the second macroblock count and correcting the sequence data in the memory with data representing the estimated picture size, and (d) instructing the video decoder to resume the decoding process by using the sequence data of the memory immediately after the first and second macroblock counts are determined to be equal to each other or immediately after the sequence data in the memory is corrected.

According to a second aspect, the present invention provides a method of decoding a coded video signal containing a sequence header and at least one coded picture, the sequence header including picture size data, the method comprising the steps of (a) decoding a coded sequence data contained in the header and storing the decoded sequence data in a memory, (b) performing a decoding process on a coded picture and producing a first macroblock count from the decoded, the macroblock count representing a number of macroblocks contained in the decoded picture, (c) suspending the decoding process, (d) determining a second macroblock count from picture size of the sequence data stored in the memory, (e) comparing the first macroblock count with the second macroblock count, (f) if the first and second macroblock counts are equal to each other, resuming the decoding process on the coded picture by using the sequence data of the memory, (g) if the first and second macroblock counts are not equal to each other, estimating a picture size based on the second macroblock count, (h) correcting the sequence data in the memory with data representing the estimated picture size, and (i) resuming the decoding process on the coded picture by using the corrected sequence data of the memory.

BRIEF DESCRIPTION OF THE DRAWINGS

The present invention will be described in further detail with reference to the accompanying drawings, in which:

FIG. 2 is a flowchart of the operation of the controller of FIG. 1.

DETAILED DESCRIPTION

Figure 1:
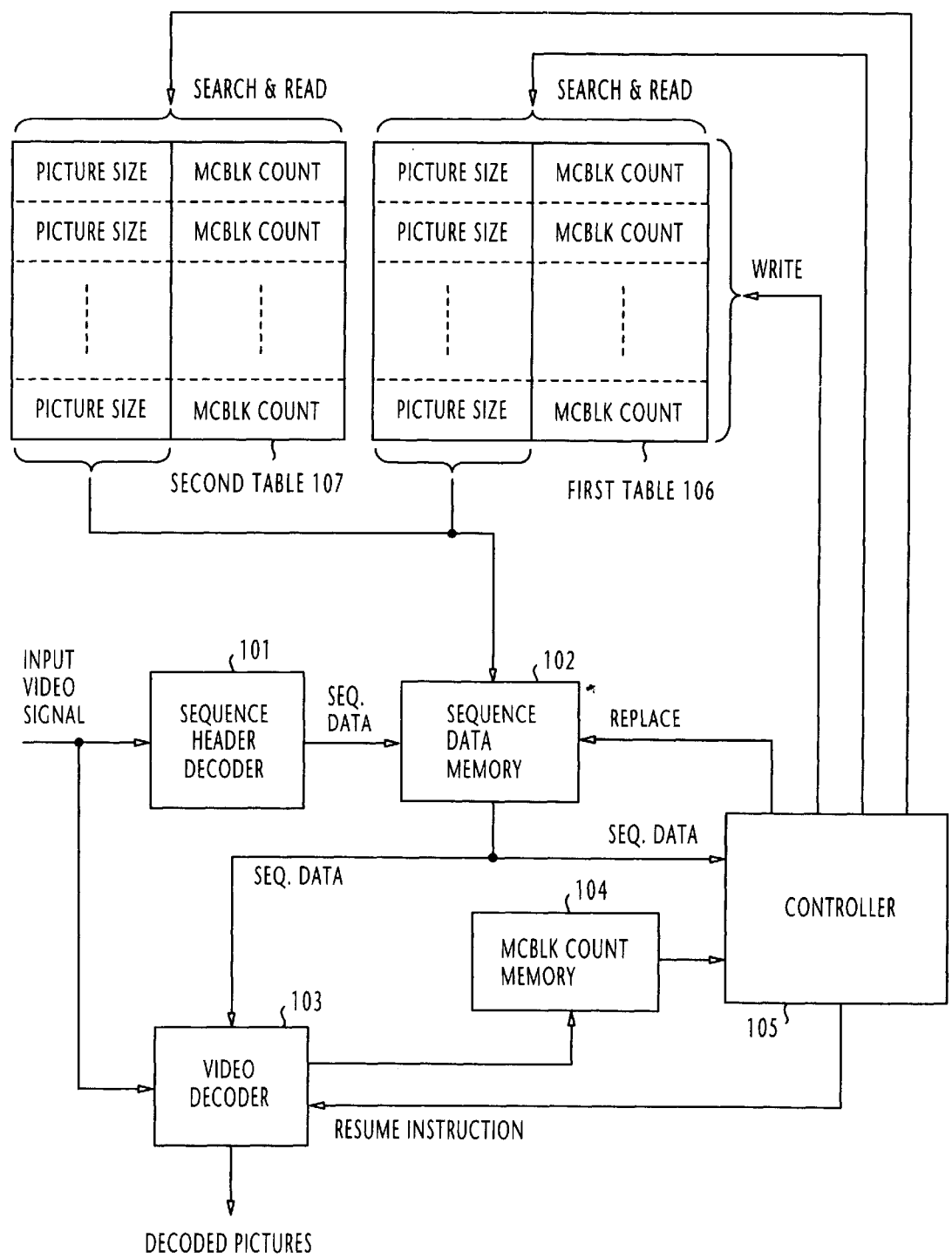
FIG. 1 is a block diagram of a video decompression decoder according to the present invention.

In FIG. 1, there is shown a digital video decoding apparatus according to the present invention. The decoding apparatus is comprised of a sequence header decoder 101 for receiving a compressed digital video signal encoded according to international standards such as the MPEG standards. The compressed video signal contains a sequence header and one or more groups of compressed pictures according to the formats of MPEG-1 and MPEG-2 or a coded single picture in the case of the MPEG-4 format. Sequence header decoder 101 decodes the sequence data contained in the sequence header and stores the decoded sequence data in a sequence data memory 102.

The sequence data includes a sequence header code for indicating the starting point of the sequence header, data indicating the horizontal size of a picture (indicating the number of pixels in the horizontal direction of a picture), the vertical size of the picture (indicating the number of pixels in the vertical direction of the picture), the pel aspect size (indicating the aspect ratio of the picture), the picture rate (indicating the number of frames in a second) and the bit rate, and so forth. Among these, the data indicating the horizontal size and vertical size represent the "picture size". In each picture, all of its pixels are grouped into "macroblocks" of 16×16 pixels each.

The sequence header is followed by one or more groups of compressed pictures. These pictures are supplied to a video decoder 103 which performs a decoding process on each picture using the sequence data stored in the memory 102 and delivers a restored (decoded) picture to an external circuit, not shown. From a decoded portion of the picture, the video decoder 103 determines the number of macroblocks contained in that picture and stores it in a macroblock count memory 104 as a macroblock count, and then suspends its decoding process until it is instructed by a controller 105.

First and second tables 106 and 107 are provided. The first table 106 holds picture-size records each containing data indicating the picture size and macroblock count of a picture decoded in the past. The second table 107 holds a plurality of data representing predetermined picture sizes mapped to corresponding macroblock counts. Each predetermined picture size is one that is generally used for a particular macroblock count value.

Controller 105 receives the sequence data of memory 102 and determines a macroblock count from its picture size data and compares this macroblock count with the macroblock count stored in the memory 104 and determines whether they are equal or not. If they are equal, the controller 105 updates the first table 106 with the picture size currently determined from the data stored in the macroblock count memory 102 and the macroblock count currently stored in the memory 104. If they are not equal, the controller 105 concludes that a data error or a data lost has occurred in the sequence data and makes a first search through the first table 106 for a picture size using the macroblock count of the memory 104. If no picture size corresponding to that macroblock count is found, the search has failed and the controller 105 makes a second search through the second table 107 using the same value of macroblock count. If such a picture size is detected, it is used to replace the picture size stored in the sequence data memory 102. If these searches fail, the controller 105 then uses a default value for replacing the picture size of the sequence data currently stored in memory 102.

The operation of controller 105 is best understood with the following description by reference to the flowchart of FIG. 2.

At step 200, the controller 105 checks to see if a new macroblock count is stored in the memory 104 for a coded picture. If so, the controller 105 proceeds to step 201 to receive the sequence data of a current video sequence from the memory 102 and determines the number of macroblocks from the picture size data contained in the sequence data and compares this macroblock count with the one stored in the macroblock count memory 104 (step 202). If the values of these two macroblock counts are equal (step 203), the controller 105 concludes that there is no data error in the sequence data and proceeds to step 204 to store the current picture size and macroblock count in the first table 106. Controller 105 proceeds from step 204 to step 205 to instruct the video decoder 103 to resume the decoding process by using the sequence data of memory 102, and returns to the starting point of the routine.

If there is a data error or lost in the sequence data, the decision at step 203 is negative and the controller 105 proceeds to step 206 and makes a search through the first table 106 for a picture size that corresponds to the macroblock count value that is supplied from the memory 104. If such a picture size is found in the first table 106, the decision at step 207 is affirmative and the controller proceeds to step 210 to replace the picture size data in the sequence data memory 102 with the picture size detected in the first table 106 and proceeds from step 210 to step 212.

If the decision at step 207 is negative, the controller 105 proceeds to step 208 and makes a further search through the second table 107 for a predetermined picture size corresponding to the macroblock count of memory 104. If there is one (step 209), step 210 is executed by replacing the picture size of memory 102 with the picture size detected in the second table 107. If the decision at step 209 is negative, the controller 105 proceeds to step 211 to replace the picture size of memory 102 with a default value (e.g., the picture size of the display unit used) and proceeds from step 211 to step 205.

At step 205, the controller 105 instructs the video decoder 103 to resume its decoding process by using the corrected sequence data of memory 102. Following the execution of step 205, the controller 105 returns to step 200 to continue the video decoding process on the next picture.

What is claimed is:

1. A video decoding apparatus for decoding a coded video signal containing a sequence header and at least one coded picture, said sequence header including picture size data, the apparatus comprising:

a sequence header decoder for decoding a coded sequence data contained in said header and storing the decoded sequence data in a memory;

a video decoder for performing a decoding process on a coded picture and producing a first macroblock count from the decoded picture and suspending the decoding process when the first macroblock count is produced, said macroblock count representing a number of macroblocks contained in the decoded picture; and control circuitry for (a) determining a second macroblock count from picture size of the sequence data stored in said memory, (b) comparing said first macroblock count with said second macroblock count, (c) if said first and second macroblock counts are not equal to each other, estimating a picture size based on said second macroblock count and correcting the sequence data in said memory with data representing the estimated picture size, and (d) instructing said video decoder to resume the decoding process by using the sequence data of said memory immediately after said first and second macroblock counts are determined to be equal to each other or immediately after the sequence data in said memory is corrected.

2. The video decoding apparatus of claim 1, wherein said control circuitry comprises a first table for mapping a plurality of picture size data to a plurality of corresponding macroblock counts and control means for storing a set of picture size data and a corresponding macroblock count in said table as a new picture size record when said first and second macroblock counts are equal to each other and making a search through said first table for detecting a picture size corresponding to said second macroblock count when said first and second macroblock counts are not equal to each other and replacing the picture size data in said memory with data representing the detected picture size.

3. The video decoding apparatus of claim 2, wherein said control circuitry further comprises a second table for mapping a plurality of predetermined picture size data to a plurality of corresponding macroblock counts, said control means being responsive to a failure in said search through said first table for making a further search through said second table for detecting a predetermined picture size corresponding to said second macroblock count and replacing the picture size data in said memory with data representing the detected predetermined picture size.

4. The video decoding apparatus of claim 3, wherein said control means is responsive to a failure in said further search for replacing the picture size data in said memory with a default value.

5. A method of decoding a coded video signal containing a sequence header and at least one coded picture, said sequence header including picture size data, the method comprising the steps of:
   a) decoding a coded sequence data contained in said header and storing the decoded sequence data in a memory;
   b) performing a decoding process on a coded picture and producing a first macroblock count from the decoded, said macroblock count representing a number of macroblocks contained in the decoded picture;
   c) suspending the decoding process;
   d) determining a second macroblock count from picture size of the sequence data stored in said memory;
   e) comparing said first macroblock count with said second macroblock count;
   f) if said first and second macroblock counts are equal to each other, resuming the decoding process on said coded picture by using the sequence data of said memory;
   g) if said first and second macroblock counts are not equal to each other, estimating a picture size based on said second macroblock count;
   h) correcting the sequence data in said memory with data representing the estimated picture size; and
   i) resuming the decoding process on said coded picture by using the corrected sequence data of said memory.

6. The decoding method of claim 5, wherein step (g) comprises:
   mapping picture size data contained in the sequence data of said memory to said second macroblock count in a first table when said first and second macroblock counts are equal to each other; and
   making a search through said first table for detecting a picture size, as said estimated picture size, corresponding to said second macroblock count when said first and second macroblock counts are not equal to each other.

7. The decoding method of claim 6, wherein step (h) comprises the step of replacing the picture size data of the sequence data in said memory with data representing the detected picture size.

8. The decoding method of claim 6, wherein step (g) further comprises the steps of:
   $g_1$) mapping a plurality of predetermined picture size data to a plurality of corresponding macroblock counts in a second table;
   $g_2$) responsive to a failure in said search through said first table, making a further search through said second table for detecting a predetermined picture size, as said estimated picture size, corresponding to said second macroblock count.

9. The decoding method of claim 8, wherein step (h) comprises the step of replacing the picture size data of the sequence data in said memory with data representing the detected predetermined picture size.

10. The decoding method of claim 8, wherein step ($g_2$) comprises the step of replacing the picture size data in said memory with a default value if said further search results in a failure.

* * * * *